July 13, 1965　　　F. ESPADA KYWI　　　3,194,386
BUCKET DISCHARGE DEVICE

Filed July 29, 1963　　　　　　　　　　　2 Sheets-Sheet 1

FERMÍN ESPADA-KYWI
INVENTOR.

BY

July 13, 1965  F. ESPADA KYWI  3,194,386
BUCKET DISCHARGE DEVICE

Filed July 29, 1963  2 Sheets-Sheet 2

FERMÍN ESPADA-KYWI
INVENTOR.

BY

3,194,386
BUCKET DISCHARGE DEVICE
Fermín Espada Kywi, Paseo Turull 1, Barcelona, Spain
Filed July 29, 1963, Ser. No. 298,047
3 Claims. (Cl. 198—147)

The invention relates to bottle washing machines particularly adapted to improve the conditions of operation of bottle washing machines of the kind in which the bottles are placed on baskets or supports held by means of articulated chains or other conveyor devices which move the bottles through the various treatment stages in the machine.

In this kind of machine, it is necessary to compel the conveyor chains to follow complicated paths within the bottle loading and discharging areas in order to place the baskets in the position appropriate for carrying out these operations correctly. All this raises complications which increase unduly the price of the machine. Furthermore, the liability to mechanical failure is increased.

The invention has among its objects to eliminate these disadvantages.

According to the invention the transverse series of baskets or supports holding the bottles are secured to rods or strips disposed longitudinally with respect to the direction of motion of the conveyor means. The rods or strips are connected at one end to parts of the conveyor which are aligned transversally relatively to the conveyor itself, and they rest normally on further parts of the conveyor spaced longitudinally relatively to the connecting positions. The rods are associated with driving means which cause them to oscillate about their positions of oscillation so as to tilt the baskets, for example, projecting nipples sliding in guides disposed according to the contour which is external relatively to the conveyor in the bottle loading and discharging areas.

As a result of this diversity of paths between the nipples and the conveyor, the nipples are deflected from the path of the conveyor and this makes it possible for the series of baskets to be given any desired inclination, different from that provided by the path of the conveyor and in accordance with the lay-out given in each case to the above-mentioned guides.

The rods, which are secured at the middle positions to the series of baskets, are connected—preferably at one of the ends—to respective axles of articulation of a link chain, and the opposite ends are provided with notches of suitable size and suitably placed so as to fit on axles of articulation of the chain disposed adjacent to the other previously mentioned axles.

The invention is diagrammatically illustrated by way of example in the accompanying drawings, in which.

Figure 1:
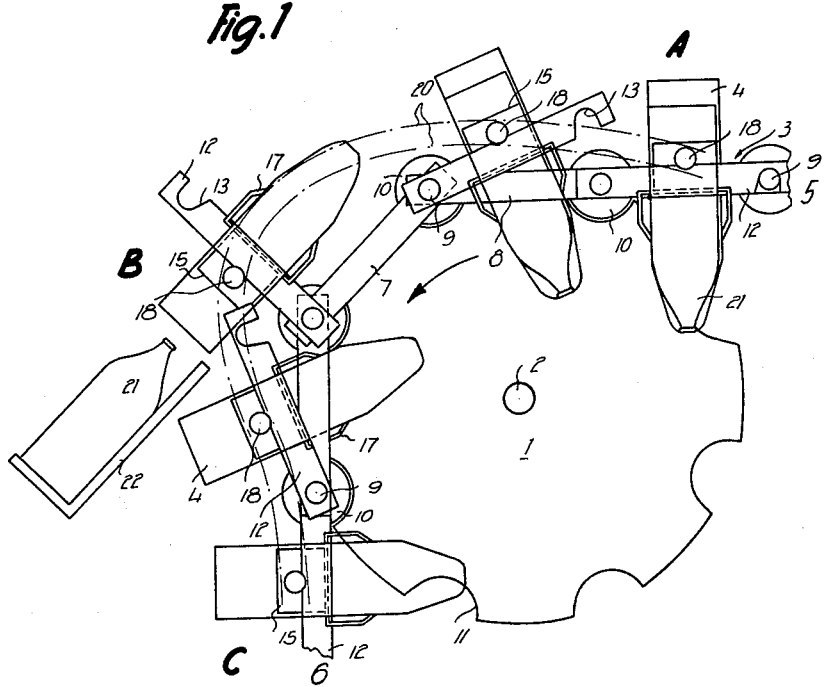
FIGURE 1 is a side elevation of the bottle loading and discharging area in a washing machine provided with conveyor chains.
Figure 2:
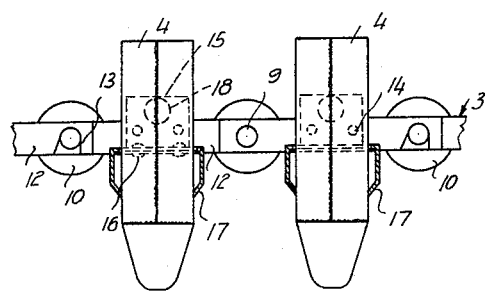
FIGURE 2 is a longitudinal elevation of part of the chain with baskets.
Figure 3:
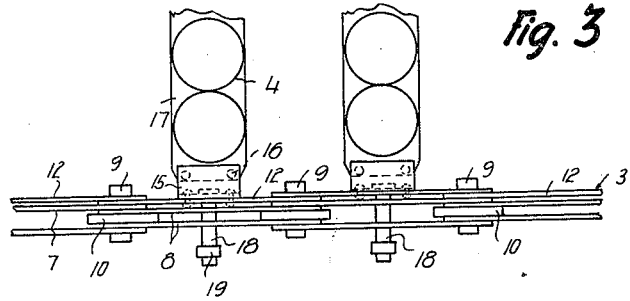
FIGURE 3 is a partial bottom plan.

The bottle unloading area consists of the plates 1 rotating on the shaft 2 and moving the chain 3 carrying the transverse baskets 4 between an inlet horizontal branch 5 and an outlet vertical branch 6. It is understood that there is a similar mechanism on each side of the machine and that the series of baskets are connected at their ends to the respective chains.

Each of the chains is made up of pairs of small plates 7 and 8 which form their links and which are articulated both externally and internally on the axles 9 through orifices formed for this purpose at the ends of the plates. Between each two internal plates, the supporting rollers 10 are mounted loose on the axles 9; the rollers 10 are lodged in the notches 11 in the guide plates 1 and rest on guide rails, not shown, in the other parts of the machine circuit.

Each of the axles 9 is connected to a further small plate 12, the opposite end of which is free and has a notch 13 in its lower edge adapted to engage with the axle 9 of the articulation of the chain lying immediately behind. Angle plates 15 are secured by rivets 14 to the middle part of the plates 12 and have a horizontal branch provided inside the system and a vertical branch projecting through the system.

Secured to the edges of the horizontal flanges of the angle plates 15 by means of rivets 16 are the ends of rectangular boxes 17 disposed transversally relatively to the machine and in which the baskets 4 in each series are mounted.

The vertical flanges of the angle plates 15 have secured on them rods 18 ending in contact rollers 19 which are compelled to run along a path determined by the guides diagrammatically shown by the broken lines 20.

The operation of the mechanism will be clearly understood from the figures in the drawings, bearing in mind that the whole moves in the direction shown by the arrow in FIGURE 1. The baskets 4 are normally found in the position A during the various working stages of the machine but, when the rollers 19 enter the guides 20, the baskets begin tilting forward gradually until the reach, in the discharge position B, their maximum deviation relatively to the path of the conveyor chains 3, at which moment the bottles 21 are allowed to fall on the collecting bracket 22. The baskets then return to their normal position, which is reached at position C.

A similar operation can be carried out in vertical branches of the chain, provided that the guides 20 are suitably laid out.

The simplicity of the described mechanism is evident and it can also be seen that its efficiency is equivalent or superior to that of other complex systems. Moreover, it can be adapted to assume a large variety of constructions and may therefore be used both in the production of new machines and in the transformation of existing machines.

In place of the guides 20, any equivalent mechanical or hydraulic device which the technician could easily provide in the light of the above description, could alternatively be used for tilting the baskets.

I claim:
1. Article conveying and discharging mechanism comprising a pair of endless chains, each chain having a plurality of links pivotally connected together on axles, a support roller rotatably mounted on each axle, a plate pivotally mounted at one end to each axle, each plate having a notch adjacent the other end engageable with the next adjacent axle, an angle member fixed to each of said plates of each chain and having portions extending inwardly toward each other, a box connecting the inwardly extending portion of one angle member with the inwardly extending portion of the angle member of the other chain, a plurality of article-holding baskets carried by each of said boxes, a rod extending outwardly from each angle member, sprocket means engageable with said support roller to drive said chains and alter the direction of movement thereof, cam guide means located adjacent to said sprocket means, and said guide means receiving said rods, whereby movement of said rods through said guide means will tilt said plates about their pivoted ends as the chains travel over said sprocket means to discharge articles from said baskets.

2. Article conveying and discharging mechanism comprising a pair of generaly parallel endless chains, each chain having links pivotally connected together by axles, an independent plate pivotally mounted at one end to each axle, each plate having a notch adjacent the other end engageable with the next adjacent axle, transversely extending article-holding container means connected at one end to one of said plates on one chain and connected at the other end to one of said plates on the other chain, a rod mounted on each plate and extending outwardly therefrom, sprocket means to drive said chains and alter the direction of movement thereof, and cam guide means located adjacent to said sprocket means for receiving said rods, whereby movement of said rods through said cam guide means will tilt said plates about their pivoted ends as the chains travel over said sprocket means to discharge articles from said container means.

3. The structure of claim 2 including a plurality of baskets in each of said container means.

References Cited by the Examiner

UNITED STATES PATENTS

| | | | |
|---|---|---|---|
| 2,631,465 | 3/53 | Cordis | 198—189 |
| 2,984,334 | 5/61 | Dungfelder | 198—131 |
| 3,100,041 | 8/63 | Sheehan | 198—158 |

SAMUEL F. COLEMAN, *Primary Examiner.*